Patented Aug. 10, 1954

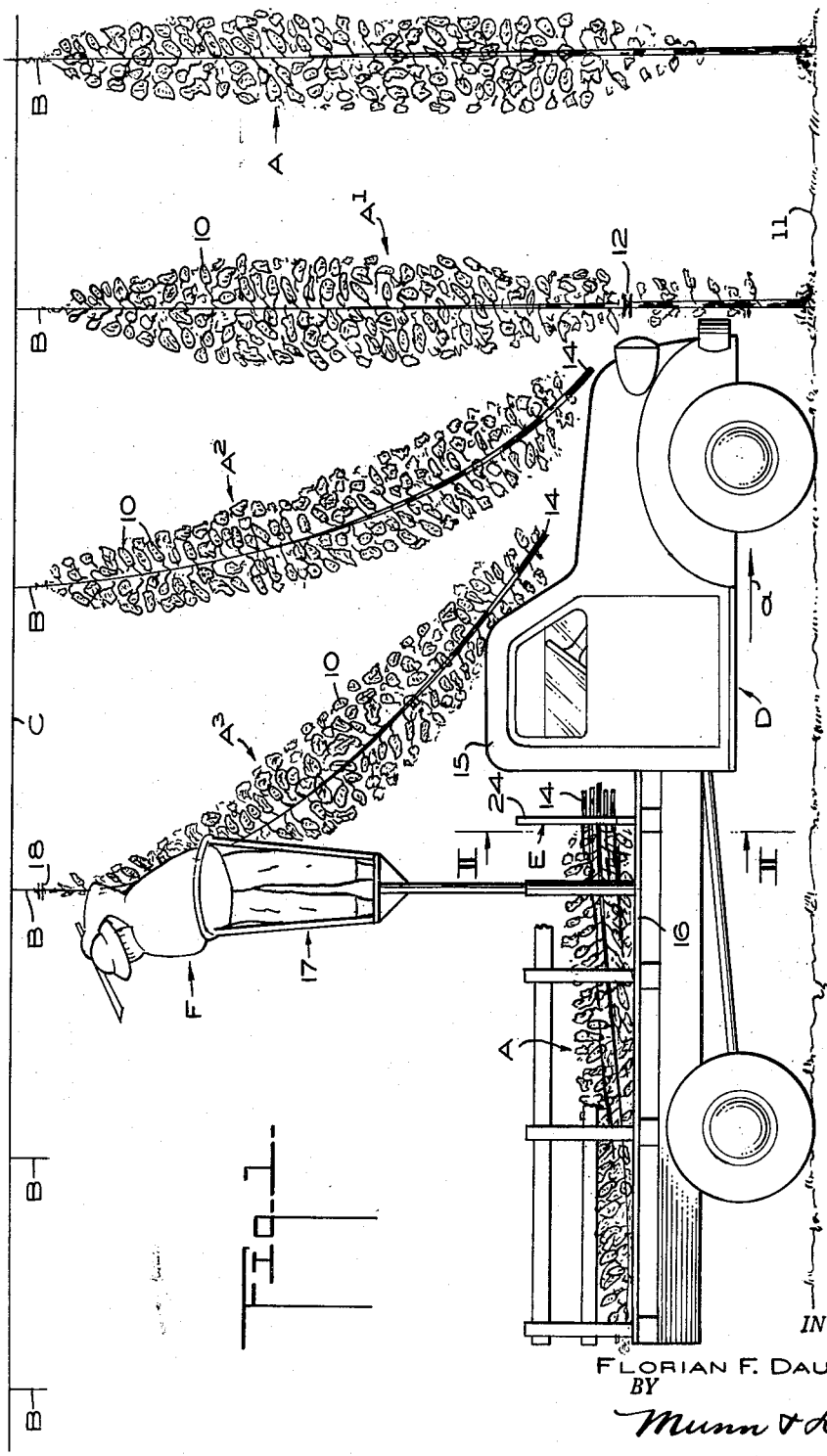

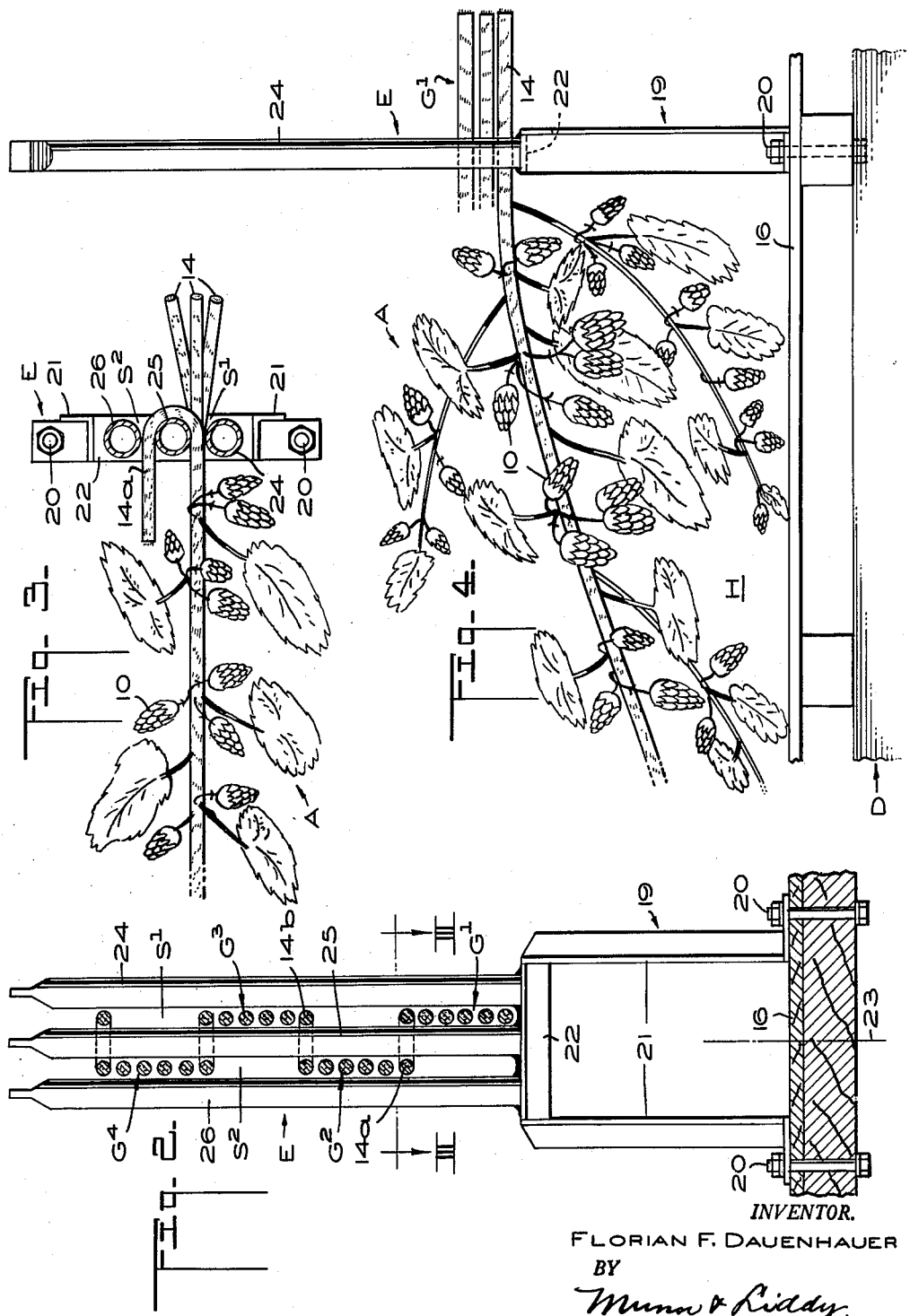

2,685,773

UNITED STATES PATENT OFFICE 2,685,773

METHOD OF HARVESTING AND TRANS-PORTING HOP VINES

Florian F. Dauenhauer, Santa Rosa, Calif.

Application November 20, 1951, Serial No. 257,238

6 Claims. (Cl. 56—1)

The present invention relates to improvements in a method for loading and transporting hop vines from fields to hop-picking machines. It is a continuation-in-part of my copending application on a "Hop-Transporting Mechanism," Ser. No. 179,721, filed in the United States Patent Office on August 16, 1950, now abandoned.

In the above-identified application, I provide vine-supporting carriages, which are removably mounted on truck bodies so that the vines cut in the field may be placed on these carriages; the vine-laden carriages transported to the hop-picking machine; the carriages removed from the trucks and moved along a track to the place where the vines are fed to the graspers for hop-picking operation; the empty carriages being delivered back to the trucks for return trips to the fields.

An object of this invention is to provide an improved method adapted for conveying hop vines from fields to hop-picking machine, which offers substantial reduction in costs of equipment and harvesting, as compared with the mechanism shown in said copending case.

Generally speaking, my improved method and apparatus embodied in the present application eliminates the removable carriages heretofore provided. The vines are transferred from the vehicle, such as a truck, directly to the hop-picking machine one at a time so they may be secured to the graspers. The vines are positioned on the vehicle in such a manner that they may be unloaded rapidly, while avoiding the possibility of having the vines becoming entangled with one another.

Other objects and advantages will appear as the specification continues. The novel features will be set forth in the claims hereunto appended.

Drawings

For a better understanding of the present invention, reference should be had to the accompanying drawings, forming part of this application, in which:

Figure 1 is a side elevational view of a vehicle having my improved vine-holder stand mounted thereon, and illustrating vines being loaded onto the vehicle in the field;

Figure 2 is an enlarged transverse view taken along the vertical plane II—II of Figure 1;

Figure 3 is a horizontal sectional view taken along the line III—III of Figure 2; and Figure 4 is an enlarged elevational side view of a portion of the vehicle and the vine-holding stand shown in Figure 1 immediately in back of the cab.

While I have shown only the preferred form of my invention, it should be understood that various changes, or modifications, may be made within the scope of the annexed claims without departing from the spirit thereof.

Detailed description

Referring now to Figure 1, I have illustrated a portion of a field having hop vines A growing therein. It is a common practice to plant hops in rows, and the vines in the process of growing are trained to grow up strings B, the upper ends of which are secured to an overhead trellis C. The fully developed vines, with hops 10 thereon, are suspended from this trellis. In actual practice the lower ends of these strings are anchored to the root portions of the vines near the ground 11 of the field.

It will be noted that a vehicle D, such as a truck, may be driven down a row of the hop vines in straddling relation therewith. To harvest the hops, the vines and strings are cut off at a suitable distance above the ground, say four feet, as suggested by the cut lines 12 on the vine A¹, the cutting taking place in advance of the vehicle, while leaving the vines suspended at their tops from the trellis.

As the vehicle proceeds down the row, the butt ends 14 of the cut vines are pulled up over the cab 15, as indicated by the vines A² and A³ in Figure 1. In other words, the cab "noses" beneath each vine and raises the butt end upwardly, and at the same time the vine is swung into an inclined position with its butt end pointing forwardly. During further advance of the vehicle, the vines slide over the cab in succession and are brought into a position to overlie the vehicle bed 16, with the vines still being supported by the trellis.

Now a loader places the butt ends into a vine-holding stand designated generally at E in the manner hereinafter described. It is quite apparent that I utilize the cab of the vehicle for moving the butt ends 14 of the hop vines into the approximate location of the stand E to facilitate the loader's task of securing the vines to the stand.

While this is taking place, a worker F standing on an overhead plaform 17, or crow's nest, which is supported on the vehicle, cuts each vine at 18 (see top of vine A³). Thus the vines are permitted to fall lengthwise onto the vehicle bed;

with the butt ends 14 secured to the vine-holding stand.

In its structural details, the stand E includes a base 19, which is fastened by bolts 20 to the bed of the vehicle, as clearly shown in Figures 2 to 4, inclusive. Moreover, this base is fabricated with standards 21 having a horizontal transverse member 22 secured to their tops at a predetermined distance above the bed 16.

As shown in Figure 2, the vine-holding stand E straddles the longitudinal vertical medial plane 23 of the vehicle. The stand is arranged a short distance in back of the cab 15. In order to provide an anchorage for the butt ends of the vines, I have shown three spaced-apart uprights, which are designated at 24, 25 and 26. These uprights are fixed to the horizontal member 22 so as to project thereabove, with the uprights being confined adjacent to the medial plane 23 of the vehicle.

Vertical slots $S^1$ and $S^2$ are defined between adjacent pairs of uprights 24—25 and 25—26, respectively (see Figures 2 and 3). These slots are dimensioned to have the butt ends 14 of the hop vines inserted thereinto, and have sufficient height so that a plurality or group of butt ends may be arranged in each slot one above the other.

In practice, the butt ends of the vines are inserted into one of the slots, for example the slot $S^1$, the butt ends being introduced thereinto one at a time until the vine butts build up to a predetermined distance, say six inches. This will produce a vertical group or row of butt ends designated at $G^1$, with the butts extending forwardly of the stand E (see Figures 3 and 4). Then the butt end 14a of the last or uppermost vine in this group is bent laterally and wrapped around the central upright 25 and introduced through the slot $S^2$. This will indicate that the following vines to produce a second group $G^2$ will be placed in the adjacent slot $S^2$.

These same steps are followed when inserting the butt ends into the vine-holding stand E to form the second group $G^2$. The uppermost butt end 14b of this group is wrapped around the central upright and inserted into the slot $S^1$. By way of illustration, I have shown groups $G^3$ and $G^4$ of butt ends as being anchored in the slots $S^1$ and $S^2$, respectively, in Figure 2.

This procedure is alternated from on slot to the other until both slots are full thus allowing the operator to follow and remove the vines from the top to the bottom in the reverse manner in which the vines were loaded, that is, the last vine on will be the first vine off. This procedure in removing the vines is very important in order to prevent the vines from becoming entangled with each other. Such entanglement would result in breaking vines, clusters of hops and individual hops, and would interrupt the continuous feeding of the vines from the vehicle directly to the hop-picking machine. By employing my method, one man can unload a vehicle directly to the picking machine, whereas in older methods seven men were required to do the same work.

Referring to Figures 2 and 3, the horizontal member 22 of the vine-holding stand supports the lower vines above the bed 16 to provide a space H into which these vines may sag without crushing or dislodging the hops 10 disposed thereon. (See Fig. 4.)

Summary

The steps of my method of loading and transporting hop vines from fields to hop-picking machines, and the use of the improved apparatus, are summarized briefly as follows:

Assuming that the vehicle D is being driven down a row of hop vines A in the direction of the arrow $a$ in Figure 1, in straddling relation therewith, a workman cuts each vine at 12 in advance of the vehicle, leaving the vines still supported by the strings B from the overhead trellis C.

As the vehicle proceeds, its cab 15 will "nose" under the suspended vines, swinging them through the positions indicated at $A^2$ and $A^3$. Thus the hop vines are drawn over the top of the cab, and their butt ends 14 will come into approximate location with the vine-holding stand E.

The butt ends of the vines are placed one at a time into a selected slot of the stand, for instance the slot $S^1$ to form a vertical group $G^1$ of butt ends, all extending forwardly. When the desired number of vines have been secured in position to form this initial group, the loader twists the butt end 14a of the uppermost vine in this initial group around the central upright 25, inserting this butt end into the slot $S^2$, as shown in Figure 3.

As each vine is brought into an approximate location where its butt end may be anchored to the stand E, or even before the vine reaches this position, the worker F cuts the vine from the overhead trellis C, as at 18. Thereafter, the vine will fall onto the bed 16 of the vehicle. Of course, the loader may assist in lowering the vine to prevent it from breaking, or hops 10 being dislodged therefrom.

The foregoing steps are repeated, building up the successive groups $G^2$, $G^3$, $G^4$, etc., until the desired amount of vines has been loaded. The uppermost vine in each group has its butt end twisted into the adjacent slot from that in which the particular group is confined.

Upon arrival at the location of the hop picking machine, the vines are removed from the vehicle in the reverse order in which they were loaded, that is, the last vine on is removed first. This will prevent entanglement of the vines with one another. As each vine is removed, it may be passed to and engaged with the graspers of the picking machine, thus allowing the process of picking the hops to be carried on without interruption.

I claim:

1. In the herein described method of loading and transporting hop vines from a field to a hop-picking machine, the steps of: cutting the vines in the field; stacking and securing the cut vines, with their butt ends extending in the same direction and positioned one above the other in succession to form a vertical group of the butt ends; transporting these vines to a place where the hops are to be picked; and removing the vines from the group in the reverse order in which they were stacked, commencing with the uppermost vine and progressing vine-by-vine down the group of butt ends so as to avoid the possibility of having the vines becoming entangled with one another.

2. In the herein described method of loading and transporting hop vines from a field to a hop-picking machine, the steps of: cutting the vines in the field; stacking and securing the cut vines, with their butt ends extending in the same direction and positioned one above the other in succession to form a vertical group of the butt ends; bending the butt end of the uppermost vine in this group to indicate the top vine therein; thereafter repeating the foregoing steps to provide a second vertical group of stacked hop vines having their butt ends offset laterally relative to and disposed above the butt ends in the first group; transporting these vines to a place where the hops are to be picked; and removing the vines from the groups in the reverse order in which they were stacked, commencing with the uppermost vine in the second group and progressing vine-by-vine down the butt ends in the groups so as to avoid the possibility of having the vines becoming entangled with one another.

3. In the herein described method of loading and transporting hop vines from a field to a hop-picking machine, the steps of: cutting the vines in the field; stacking and securing the cut vines, with their butt ends extending in the same direction and position one above the other in succession to form a first vertical group of the butt ends; bending the uppermost vine in this group to indicate the top of this group; thereafter repeating the foregoing steps to provide a second vertical group of stacked hop vines having their butt ends offset laterally relative to and disposed above the butt ends in the first group, including the step of bending the butt end of the uppermost vine in the second group to indicate the top vine in this group; thereafter repeating the foregoing steps to provide third and fourth groups of butt ends, which are spaced above the first and second groups, respectively; continuing these steps until a predetermined height of stacked vines has been obtained; transporting these vines to a place where the vines are to be picked; and removing the vines from the several groups in the reverse order in which they were stacked, commencing with the uppermost vine in the last established group and progressing vine-by-vine down the groups of butt ends so as to avoid the possibility of having the vines becoming entangled with one another.

4. In the herein described method of loading and transporting hop vines from a field to a hop picking machine, the steps of: cutting the vines in the field; stacking and securing the cut vines, with their butt ends extending in the same direction and positioned one above the other in succession to form a vertical group of the butt ends; supporting the butt ends of the lower vines to provide a space into which these vines may sag without crushing or dislodging the hops disposed thereon; transporting these vines to a place where the hops are to be picked; and removing the vines from the group in the reverse order in which they were stacked, commencing with the uppermost vine and progressing vine-by-vine down the group of butt ends so as to avoid the possibility of having the vines becoming entangled with one another.

5. In the herein described method of loading and transporting hop vines from a field, the steps of cutting the lower portions of the vines free from the root ends thereof, while supporting the vines at their upper portions; swinging each vine in succession into an inclined position; arranging and securing the butt ends of the vines to extend in the same direction, with these butt ends positioned one above the other to form a vertical group of the butt ends; and freeing the upper portions of the vines to allow the vines to fall into a substantially horizontal transporting position.

6. In the herein described method of loading and transporting hop vines from a field, the steps of cutting the lower portions of the vines free from the root ends thereof, while supporting the vines at their upper portions; swinging each vine in succession into an inclined position; arranging and securing the butt ends of the vines to extend in the same direction, with these butt ends positioned one above the other to form a vertical group of the butt ends; freeing the upper portions of the vines to allow the vines to fall into a substantially horizontal transporting position; and removing the vines from the group in the reverse order in which they were stacked, commencing with the uppermost vine and progressing vine-by-vine down the group of butt ends so as to avoid the possibility of the vines becoming entangled with one another.

References Cited in the file of this patent

UNITED STATES PATENTS

| Number | Name | Date |
|---|---|---|
| 967,040 | McWane et al. | Aug. 9, 1910 |
| 1,125,610 | Washburn | Jan. 19, 1915 |
| 1,393,054 | Turner | Oct. 11, 1921 |
| 1,515,214 | Kelleher et al. | Nov. 11, 1924 |
| 1,629,422 | Trulove | May 27, 1927 |
| 1,977,784 | Urschel | Oct. 23, 1934 |
| 2,560,729 | Lynn et al. | July 17, 1951 |
| 2,579,774 | Akey | Dec. 25, 1951 |